W. E. HOLLAND AND J. M. SKINNER.
STORAGE BATTERY SEPARATOR.
APPLICATION FILED MAY 17, 1919.
1,329,180. Patented Jan. 27, 1920.
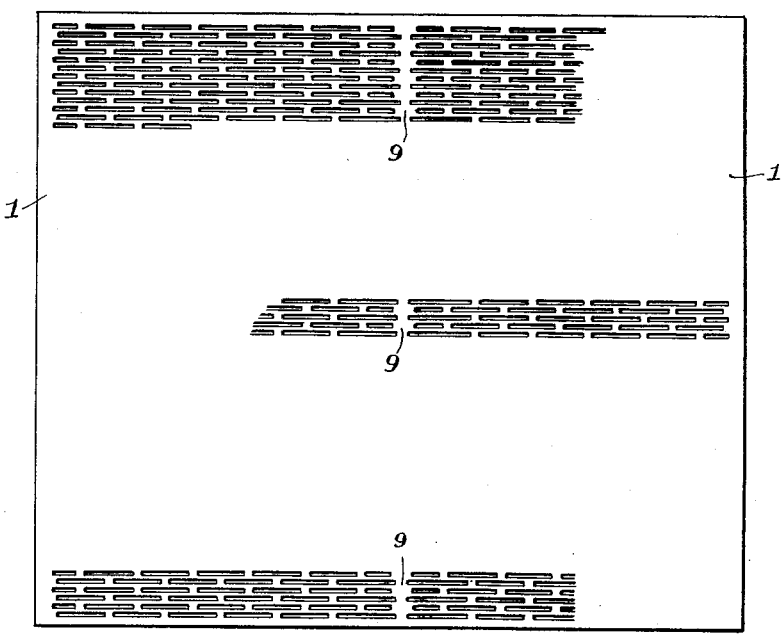
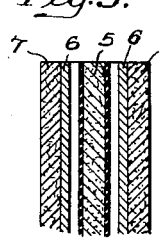
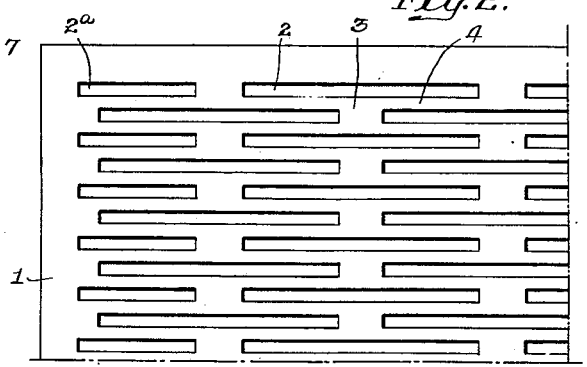
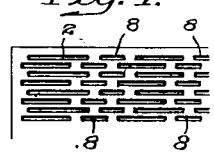
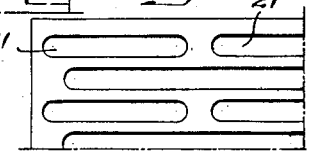
Inventors.—
Walter E. Holland
James M. Skinner,
by their Attorneys.
Howson & Howson

UNITED STATES PATENT OFFICE.

WALTER E. HOLLAND AND JAMES M. SKINNER, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

STORAGE-BATTERY SEPARATOR.

1,329,180.  Specification of Letters Patent.  Patented Jan. 27, 1920.

Application filed May 17, 1919. Serial No. 297,868.

*To all whom it may concern:*

Be it known that we, WALTER E. HOLLAND and JAMES M. SKINNER, citizens of the United States, residing in Philadelphia, Pennsylvania, have invented Storage-Battery Separators, of which the following is a specification.

Heretofore it has been found to be practically impossible to utilize perforated rubber separators for insulating the alternated positive and negative plates of that type of storage battery particularly designed for use in cranking or starting internal combustion engines, since, unless a high battery voltage was maintained, the cranking motor was not able to turn over the engine or would turn it slowly so that in either case said motor drew an abnormally high current from the battery. This excessive current flow increased the voltage drop inside the battery, thus reducing still further the initially low voltage, and if the same battery was used for ignition, as is customary, the spark was weak or a total failure due to the low voltage. The battery thus not only failed to perform its primary function of cranking the engine but was a failure as a reliable source of ignition. Furthermore it became more quickly discharged and perhaps in some cases failed to deliver sufficient current for lighting.

With perforated rubber separators as heretofore made, batteries coming within the usual limits of space and weight applying to this class of service would not under load maintain the necessary high voltage and it has been customary, therefore, to omit altogether the perforated rubber separators alone, with the result that the useful life of such batteries was greatly shortened because of failure of the wood separators, which in a relatively short time became oxidized or rotted by the action of the lead peroxid of the positive plates, and were also subject to the mechanical wearing or cutting through by the plates with resultant short-circuiting of the battery cell.

We have discovered however that if the porosity, *i. e.*,—the proportion of perforated area exclusive of margins, of the rubber separators, may be made 40% or greater, they may be employed successfully and to great advantage in batteries of the type noted, and we have successfully solved the problem of producing a perforated separator having 40% or greater porosity which will not break or tear in the perforating machine, and which will also have sufficient mechanical strength for handling as well as to hold it in shape and in uniform contact with the positive plate under service conditions.

With separators of such construction placed between the positive plate faces and the wood separators, the internal resistance of the battery cell is not objectionally increased and enough positive plate surface is exposed to the action of the electrolyte through the perforations to maintain a sufficient high voltage when the battery is called upon to deliver the extremely high currents required for operating a motor coupled with an internal combustion engine, as above explained, even when conditions are at the worst as when the battery and engine are at a low winter temperature.

At the same time it is to be noted that such a high-porosity separator to be successful in other important respects must retain its ability to efficiently hold in place or retain the active material of the positive plate, and so far as we are aware high porosity combined with efficient retaining ability can only be obtained by making the perforations in the form of narrow elongated slots. Furthermore, the use of longer or larger slots, such as would increase the porosity to 40% or greater, can only be made practical by staggering or otherwise throwing the slots out of line to strengthen the separator for service and to avoid breakage and tearing.

One object of our invention therefore, is to provide a plate insulator or separator for electric storage batteries, which by reason of its high porosity, shall be particularly adapted for use in that class of batteries especially designed for engine cranking or starting purposes.

Another object of the invention is to provide a battery separator which, while having relatively high porosity, shall inherently possess sufficient mechanical strength to allow of its being readily handled and installed and be of such construction as will allow of its slots being inexpensively and uniformly formed without danger of breaking or tearing in the machine.

The invention further contemplates a battery separator having slots or perforations disposed in a novel manner whereby their bounding walls are stronger for a given size of slot, enabling the use of larger slots than in any other known forms of separators of the same general class, and providing sufficient strength to prevent distortion under conditions of service.

We also desire to provide a separator of such construction as will, in addition to possessing a high porosity adapting it for the class of work above noted, at the same time efficiently retain the active material in place upon the positive plates and prevent from passing through its perforations any particles of active material of such size as might become trapped between the face of the perforated separator and the adjacent wood separator.

Our invention is also designed to provide a separator whose perforations shall be so disposed that when placed against the face of a battery plate, the active material of the latter has uniformly distributed contact with the electrolyte while at the same time those portions of said material covered by the unperforated or solid portions of the separator are in close proximity, at all points, to the perforations and consequently to the main body of electrolyte.

These objects and other advantageous ends we attain as hereinafter set forth, reference being had to the accompanying drawings, in which, Figure 1 is an elevation, to some extent diagrammatic, illustrating a separator constructed in accordance with our invention;

Fig. 2 is an enlarged fragmentary elevation of the separator shown in Fig. 1;

Figs. 3 and 4 are fragmentary elevations of modified forms of separators incorporating our invention;

Fig. 5 is a fragmentary transverse vertical section of certain of the elements of a storage battery and their associated structures, arranged in accordance with one feature of our invention;

Figs. 6 and 7 are fragmentary elevations of other modifications of our invention; and Fig. 8 is a transverse section of the separator shown in Fig. 3.

In Figs. 1 and 2 of the above drawings, 1 represents a flat sheet of hard rubber or similar insulating material suitable for use as a separator having, in a typical case, a thickness of one sixty-fourth of an inch. This sheet is provided with a number of parallel series of elongated, substantially rectangular slots 2 of which those of one series are staggered or longitudinally displaced relatively to the slots of the two series immediately adjacent or on opposite sides of it. The slots $2^a$ at the ends of alternate rows are preferably of a length about half that of the slots 2 and the distance between the slots is, in a typical case, equal to or about the width of the slots. If desired the alternate slots 8 of each series may be approximately half the length of the remaining slots as shown in Fig. 4 while as before being staggered relatively to the slots of the adjacent series.

By arranging the slots as above specified there is left between the adjacent ends of each pair of slots in the same row an imperforate portion 3 lying immediately adjacent the middle portions of the two slots on opposite sides of the two first mentioned in the case of Figs. 1 and 2, so that the elongated, narrow parts 4 of the separator lying between and defining the end portions of adjacent slots are braced and stiffened by said portions 3. Likewise, by reason of the staggered construction, the portions 4 defining the end portions of the walls of the slots are less than half of the length of said slots instead of being the same length as would be the case if the slots were not staggered. By reason of this construction, it is possible to make the slots of greater length and width and likewise to decrease the width of the elongated strip portions 4 between the slots, thus increasing the porosity without materially weakening the separator plate as a whole.

By means of our construction therefore the proportion of the perforated to the total area of the separator may be made from 40% to upward of 60% without rendering the separator objectionably weak or flimsy. The separator will also possess satisfactory ability to retain the active material on the positive plate and to prevent said material from rotting the wood separator. The staggered construction above described possesses a further advantage in that the separator does not tend to break or tear along the lines of the ends of the slots, either during its manufacture or when subsequently handled.

Such separators constructed as above described to have a relatively high porosity, i. e.—at least 40%, are particularly suitable for use in storage batteries designed to supply current for the operation of electric motors used to start or crank internal combustion engines for by reason of this characteristic of the separator, the battery is enabled to supply relatively high currents with what is a relatively small drop in its electromotive force.

In employing these separators in such a battery in the usual way two of them are placed against the opposite faces of the positive plates 5 respectively and each of them in turn is engaged by the ribbed face of a wood separator 6. The negative plates 7 are then placed next to the unribbed or flat faces of the wood separators as illustrated in Fig. 5.

If desired we may so dispose the perforations or slots of the separator as to provide one or more continuous imperforate portions 9 extending longitudinally of the separator and transversely of the series of slots with a view to longitudinally strengthening the separator as well as making it easier to feed in the machine and more convenient to handle.

In some cases it may be preferable to round the ends of the slots, for instance, as shown in Fig. 7 at 21, which, however, will slightly reduce the porosity for a given size and spacing of slots although the separator is thereby improved in strength to resist breakage and tearing.

That arrangement of slots illustrated in Fig. 3 also secures a freedom from tendency to break or tear transversely of the separator along a line adjoining the ends of the slots. According to this modification of the invention the slots are all made of the same length and parallel but each of them is inclined at a slight angle to what in the present instance is a horizontal line. In the preferred form of this modification the slots are arranged in vertical columns with imperforate strips or areas 10 between adjacent columns. The slots as before are substantially in the form of narrow elongated rectangles and being inclined, the lines of their ends are parallel instead of coincident, thereby avoiding the tendency to break or tear which would be present in the latter case. This arrangement of slots is particularly applicable to a form of separator having ribs 22 on one or both faces, of which one form is shown in Fig. 8.

As in Fig. 6 we may in some cases give the slots an angular form, i. e.—make each of them in two parts at an angle to each other and as shown at 20, stagger as well as invert the slots of alternate lines or series.

While in the foregoing description we have referred to the perforated separator as made of rubber, it is to be understood that any other material may be used, provided it is a fair insulator, has suitable mechanical qualities and withstands the action of the electrolyte and active material to a sufficient degree.

We claim:

1. The combination in a storage battery cell of alternated positive and negative plates; wood separators mounted adjacent the opposite faces of the negative plates respectively; with a separator of insulating material provided with narrow elongated slots giving a porosity of at least 40%, mounted between each wood separator and the face of the adjacent positive plate.

2. The combination in a storage battery cell of alternated positive and negative plates; wood separators between said plates respectively; with separators of insulating material having series of narrow elongated slots giving a porosity of at least 40% and mounted between certain of said plates and the adjacent wood separators.

3. The combination in a storage battery cell of alternated positive and negative plates; with separators of an insulating material provided with narrow elongated slots giving a porosity of at least 40%, mounted and maintaining insulation between said plates.

4. The combination in a storage battery cell, of alternated positive and negative plates, with separators of an insulating material. having a porosity of at least 40%, mounted and maintaining insulation between said plates.

5. A battery plate separator of insulating material formed with elongated staggered slots having an aggregate area of at least 40% of that of the entire separator exclusive of solid margins.

6. A battery plate separator of insulating material having perforations aggregating at least 40% of its total area, exclusive of solid margins.

7. A battery plate separator consisting of a sheet of insulating material formed with parallel elongated slots of which those of each series lie at an angle to the line of such series.

8. A battery plate separator consisting of a sheet of insulating material formed with parallel elongated substantially rectangular slots arranged in parallel columns and each inclined at an angle of other than 90° to the line of its column.

In witness whereof we affix our signatures.

WALTER E. HOLLAND.
JAMES M. SKINNER.